(12) United States Patent
Baker

(10) Patent No.: US 7,050,476 B2
(45) Date of Patent: May 23, 2006

(54) WAVEGUIDE LASER RESONATOR

(75) Inventor: Howard John Baker, Scotland (GB)

(73) Assignee: Heriot-Watt University, Scottland (GB)

( * ) Notice: Subject to any disclaimer, the term of this patent is extended or adjusted under 35 U.S.C. 154(b) by 238 days.

(21) Appl. No.: 10/439,529

(22) Filed: May 16, 2003

(65) Prior Publication Data

US 2003/0214993 A1    Nov. 20, 2003

(30) Foreign Application Priority Data

May 16, 2002  (GB)  ................................ 0211202.7

(51) Int. Cl.
*H01S 3/08*  (2006.01)

(52) U.S. Cl. .......................................... 372/92; 372/99

(58) Field of Classification Search ................ 372/92, 372/95, 99
See application file for complete search history.

(56) References Cited

U.S. PATENT DOCUMENTS

| | | | |
|---|---|---|---|
| 4,719,639 A | 1/1988 | Tulip | |
| 5,048,048 A | 9/1991 | Nishimae et al. | |
| 5,052,017 A * | 9/1991 | Hobart et al. | 372/99 |
| 5,125,001 A * | 6/1992 | Yagi et al. | 372/92 |
| 5,264,869 A * | 11/1993 | Appel et al. | 347/248 |
| 5,335,242 A | 8/1994 | Hobart et al. | |
| 6,160,824 A | 12/2000 | Meissner et al. | |
| 6,442,186 B1 * | 8/2002 | Vitruk | 372/95 |

OTHER PUBLICATIONS

Abramski, K.M., et al., "Power scaling of large-area transverse radio frequency discharge $CO_2$ lasers," Appl. Phys. Lett., May 8, 1989, pp. 1833-1835, vol. 54, No. 19, American Institute of Physics.

Baker, H.J., et al., "High power Nd:YAG planar waveguide lasers and amplifiers," Conference Digest: Laser 2001 Conference (Munich), 1 page.

Baker, H.J., et al., "A planar waveguide Nd:YAG laser with a hydrid waveguide-unstable resonator," Optics Communications, May 1, 2001, pp. 125-131, vol. 191, Elsevier Science B. V.

Degnan, John J., et al., "Finite-aperture waveguide-laser resonators," IEEE Journal of Quantum Electronics, Sep. 1973, pp. 901-910, vol. QE-9, No. 9.

(Continued)

*Primary Examiner*—Minsun Oh Harvey
*Assistant Examiner*—Dung Nguyen
(74) *Attorney, Agent, or Firm*—Young & Basile, P.C.

(57) ABSTRACT

The invention relates to a new configuration for a laser resonator for use in combination with a solid-state laser gain medium contained within the core of a planar waveguide. The resonator has a substantially confocal negative branch unstable resonator configuration in a lateral direction, a low loss waveguide resonator configuration in a transverse direction, and the focal point of the unstable resonator is disposed outside the planar waveguide to avoid optical damage or breakdown in the gain medium. The preferred embodiment includes an effective means of transverse mode selection for the case when the planar waveguide is of the multi-mode type. The invention also provides a new low loss waveguide resonator configuration which may be used with planar waveguide gas lasers.

40 Claims, 3 Drawing Sheets

OTHER PUBLICATIONS

Friel, G.J., et al., "Amplification of cw and high repetition rate pulsed radiation in an ultra-compact Nd:YAG planar waveguide power amplifier, face-pumped by diode bars," Technical Digest: Conference on Lasers and Electro-Optics 2001 (Baltimore), May 6-11, 2001, p. 581, and two PowerPoint slides presented by one of the inventors during a presentation at the conference, 1 page.

Friel, G.J., et al., "High average power cw face pumping of a Nd:YAG planar waveguide laser with diode bars," Conference Digest: Conference on Lasers and Electro-Optics Europe 2000 (Nice), Sep. 10-15, 2000, p. 172.

Jackson, P.E., et al., "$CO_2$ large-area discharge laser using an unstable-waveguide hybrid resonator," Appl. Phys. Lett., May 15, 1989, pp. 1950-1952, vol. 54, No. 20.

Lee, J.R., et al., "A high power, high brightness, efficient Nd:YAG planar waveguide oscillator and amplifier," Conference Digest: QEP Conference 2001 (Glasgow), Abstract of paper, 2 pages.

Lee, J.R., et al., "A Nd:YAG planar waveguide laser operated at 121W output with face-pumping by diode bars, and its use as a power amplifier," Conference Digest: Advanced Solid State Lasers Topical Meeting 2001 (Seattle), pp. 1-3, and two PowerPoint slides presented by one of the inventors during a presentation at the conference, 1 page.

.Lee, J.R., et al., "A Nd:YAG planar waveguide laser operated at 121W output with face-pumping by diode bars, and its use as a power amplifier," pp. 1-5, preprint of paper published in Trends in Optics and Photonics, 2001, pp. 36-40, vol. 50.

Siegman, "Chapter 22: Unstable Optical Resonators" and "Chapter 23: More on Unstable Resonators," LASERS, 1986, pp. 858-922, University Science Books, California.

Chesworth, Andrew A., "Mode Control in Thin Slab, Diode Pumped Solid State Lasers" Thesis, Apr. 1998, Cover-p. 190, Heriot-Watt University.

Lee, J.R., et al., "High-average-power Nd:YAG planar waveguide laser . . . ," Optics Letters, Apr. 1, 2002, pp. 524-526, vol. 27, No. 7, Optical Society of America.

Siegman, Anthony E., "Section 20.6 Coordinate Scaling with Huygens' Integrals," Lasers, 1986, p. 805, University Science Books, Mill Valley, California.

\* cited by examiner

WAVEGUIDE LASER RESONATOR

TECHNICAL FIELD

The present invention relates to laser resonators. In particular, though not exclusively, the invention relates to a new configuration for a laser resonator for use in combination with a laser gain medium contained within the core of a planar waveguide.

BACKGROUND OF THE INVENTION

The planar waveguide as a laser medium has the advantages of confining the laser radiation closely within the gain region, allowing extremely efficient cooling of the gain region, and providing a laser power which may scale in proportion to the area of top and bottom surfaces of the planar waveguide. With reference to FIG. 1, key terminology is now defined for a planar waveguide gain region 1. The section of planar waveguide in this case has a core 2 of active material of core height (or "thickness") a, width w and length L. The ratio w/a is normally considerably greater than unity for the term "planar waveguide" to be used and for the resonator configuration described here to be of interest. The core 2 is sandwiched between an upper cladding layer 3 and a lower cladding layer 4. The cladding layers 3, 4 provide the effect of guiding laser light substantially through the core region. FIG. 1 also shows common terminology used in describing the propagation of light in a planar waveguide and followed later in this document. The resonator axis, which is also the direction of propagation of light in the planar waveguide, is denoted by the direction Z. The direction normal to the laser resonator axis and propagation of light is referred to as the lateral direction, X, when it lies in the plane of the planar waveguide. The direction normal to the planar waveguide is referred to as the transverse direction, Y.

In long-standing prior art for planar waveguide lasers, also commonly referred to as slab waveguide lasers, the planar waveguide has commonly been of the hollow type with the gain produced by an internal electrical discharge in a laser gas. (Tulip, U.S. Pat. No. 4,719,639, Abramski et al. Applied Physics Letters 54, 1833 (1989), Jackson et al. Applied Physics Letters 54, 1950 (1989)). In these cases, the gas discharge region takes the place of the core region shown in FIG. 1 and metal electrodes take the place of the claddings. The laser resonator for use with such lasers has been commonly referred to as being of a hybrid type, as it combines the properties of free-space and waveguide laser resonators. Such resonators collect light from the extended area within the planar waveguide and emit it into a high quality, near-diffraction-limited laser beam, by coupling it out around the edge of one of the two resonator mirrors.

In the plane which is parallel to the guiding surfaces, known as the lateral axis, the resonator is the type known as the confocal unstable resonator, as described for example by Siegman in chapters 22 and 23 of his textbook "Lasers" (published by University Science Books, Mill Valley, Calif., 1986). Unstable resonators are widely used to produce a near-diffraction-limited beam from a resonator mode of large volume, usually by coupling light out of the laser around the edge of one end mirror, often abbreviated by the term "edge-coupling". Exceptionally, the output beam may be coupled through one end mirror with a partially reflective coating, known as a "continuously-coupled unstable resonator" or be coupled through a coating whose reflectivity varies with position across the mirror, often referred to as a "variable reflectivity output mirror" or VRM. A specific and advantageous configuration of unstable resonator is termed "confocal" and provides a substantially collimated output beam. The term "confocal" means that the two curved mirrors forming the resonator are positioned so that their focal points for parallel incident light are at the same point in the resonator.

When applied only in the lateral direction within a planar waveguide, the confocal unstable resonator may be of the positive branch type (Tulip, U.S. Pat. No. 4,719,639, Jackson et al. Applied Physics Letters 54, 1950 (1989)) made up of a concave rear mirror and convex output mirror with a cut-away edge to transmit the output beam. Such a resonator is now known to have a high sensitivity to mirror misalignment and is not usually preferred. Alternatively a negative branch unstable resonator may be used, made up of two concave mirrors (Nishimae et al. U.S. Pat. No. 5,048,048, Hobart et al. U.S. Pat. No. 5,335,242). This has a low sensitivity to mirror misalignment but produces an undesirable focussed beam within the laser gain medium. This can be tolerated in the case of gas lasers operating with a hollow planar waveguide as the high intensity at the focal point does not produce damage or breakdown in gas. Consequently, the negative branch type of unstable resonator is most commonly used in commercially-manufactured gas lasers which use a planar waveguide structure. The confocal negative branch resonator best matches a planar waveguide gain region with parallel lateral boundaries as in FIG. 1. However, useful resonators may be "near-confocal" with an output beam which is somewhat diverging or converging but substantially similar to the precisely confocal resonator.

In the plane that intersects the laser axis normal to the guiding surface, known as the transverse direction, the resonator mirrors may be spaced at various distances away from the position where light is no longer guided by the planar waveguide in the transverse direction. Degnan and Hall, in IEEE Journal of Quantum Electronics QE-8, 901 (1973), analysed the problem of the positioning of curved resonator mirrors outside a hollow waveguide and introduced a well-known classification of three beneficial configurations where resonator losses are low (referred to as Cases I, II, and III). Their analysis applies equally to a planar waveguide but in the transverse direction only. In these beneficial cases, light that leaves the waveguide with a transverse profile characteristic of the fundamental waveguide mode returns to the waveguide with a substantially unchanged profile after reflection from the resonator mirror. Typically more than 98%, and in some cases nearly 100%, of the light leaving the waveguide is correctly coupled back into the fundamental mode of the waveguide. The residual fraction, typically less than 2%, is coupled to higher order waveguide modes or is otherwise lost. By ensuring that each of the external mirrors is configured in one of the three beneficial cases, the resonator may have a low value of round-trip loss for the fundamental mode associated with the interchange between guided wave propagation and free-space propagation. This unwanted round trip loss may be controlled to be considerably lower in value than the resonator output coupling fraction to ensure efficient laser operation. The unwanted resonator loss may be held certainly below 4% per round trip and usually in the region of 2%. The term "low-loss waveguide resonator" is understood to mean a resonator that is configured to achieve these indicative low values of round trip loss. Resonators where mirrors are positioned not in the beneficial cases have significantly higher loss and reduced laser efficiency.

The beneficial Case I occurs when the mirror is plane and near to touching the end of the waveguide, and "near-Case I" corresponds to a mirror which is curved with a long radius of curvature placed close to the end of the waveguide. A Case II configuration occurs when the mirror is placed at a distance from the waveguide sufficient for it to be in the far-field diffraction pattern of the fundamental waveguide mode and the concave radius of curvature of the mirror is equal to its distance from the waveguide. The Case III configuration has a mirror chosen to be of concave radius of curvature close to $R=0.66\ a^2/\lambda$ and positioned at a distance $R/2$ from the end of the waveguide, where $a$ is the core thickness of the planar waveguide core (in the transverse direction), and $\lambda$ is the wavelength of emission of the laser.

In the class known as a dual-Case I waveguide resonator, both laser mirrors are in close proximity to the ends of the planar waveguide. For the hollow planar waveguide gas laser, the waveguide transmission loss increases rapidly with transverse mode order and acts to limit the laser oscillation to the lowest order mode of propagation of the waveguide. Consequently there is generally no need to provide another transverse mode selection means and placement of the mirrors close to the ends of the waveguide in the dual-Case I configuration is satisfactory for gas lasers. However, a small additional space between each mirror and the corresponding end of the waveguide can be beneficial in promoting additional mode selection and ensure the lowest resonator loss (as described by Hobart et al. U.S. Pat. No. 5,335,242).

The hybrid waveguide-unstable resonator concept is equally applicable to solid-state planar waveguides using typically a doped solid-state laser material as a core and un-doped material of lower refractive index as upper and lower claddings. Alternatively, the claddings may be an unrelated transparent optical material of appropriate refractive index and physical properties. Optical pumping of the material by for example diode lasers provides excitation of the core material. Alternatively the planar waveguide may be part of a semiconductor laser diode of the broad junction type, pumped by electrical current.

In prior art, a hybrid waveguide resonator of the positive branch type has been described using a planar waveguide made from yttrium aluminium garnet (YAG) with neodymium doping of the core (Nd:YAG) (A A Chesworth, PhD dissertation, Heriot-Watt University, 1998; Baker et al. Optics Communications, 191, 125 (2001), Lee et al. Optics Letters, 27, 524 (2002)). This laser used the positive branch unstable resonator configuration to avoid the high intensity focussed beam of the otherwise more desirable negative branch configuration. As a consequence of using the positive branch resonator, the mirror radii of curvature are relatively large and this laser is adversely affected by the additional variations of focal power generated within the resonator by, for example, non-uniform pumping of the planar waveguide core in the lateral direction.

When the solid-state planar waveguide has a core thickness and refractive index difference which allows propagation of multiple transverse waveguide modes (a multi-mode waveguide) there is little difference in the propagation loss for each guided mode. It is difficult to achieve a laser output in predominantly the lowest order transverse mode. This is a major difference in behaviour between hollow waveguide gas lasers described above and the solid-state waveguide lasers. The above cited Nd:YAG planar waveguide laser has the resonator mirrors placed very close to the end-faces of the active waveguide section, forming a good approximation to the low loss, dual-Case I waveguide resonator in the transverse direction. It operates most efficiently whilst emitting a non-diffraction-limited transverse beam made up of typically six transverse waveguide modes. In the present state-of-the-art using the positive branch type of hybrid waveguide-unstable resonator with mirrors in the dual-case I position, it is difficult to provide a mode selection means to avoid this effect. However, most applications of lasers require the best available beam quality and operation in multiple transverse modes is undesirable.

In an alternative form of this prior art (Meissner, U.S. Pat. No. 6,160,824), some of the difficulties of a multi-mode waveguide are overcome by using a planar waveguide core that is very thin, supporting only the guiding of a single transverse mode. As no transverse mode selection method is then needed, the end-faces of the solid-state waveguide may be directly ground and polished to produce the curved end-mirrors for a positive branch type of hybrid resonator. However in this configuration, the use of the preferred negative branch resonator type is still precluded by the presence of an unavoidable, intense focal point within the solid material of the waveguide core. Also in this configuration, the maximum pump power that may be applied to the active region is limited by the use of a single-mode waveguide.

It is an aim of the present invention to provide a laser resonator which avoids or minimises one or more of the foregoing disadvantages.

SUMMARY OF THE INVENTION

According to a first aspect of the invention there is provided a resonator for a solid-state planar waveguide laser, the resonator comprising two concave mirrors, one disposed on either side of a planar waveguide gain section of the laser, the planar waveguide gain section comprising a solid-state waveguide core sandwiched between an upper cladding layer and a lower cladding layer, wherein the two mirrors are formed and arranged relative to the planar waveguide gain section:

so as to provide a substantially confocal negative branch unstable resonator in a lateral direction;

so as to provide a low loss waveguide resonator in a transverse direction; and so that a focal point of the negative branch unstable resonator is disposed outside the planar waveguide gain section.

The invention thus provides a new type of hybrid waveguide-unstable resonator for solid-state planar waveguide lasers which allows the negative branch unstable resonator for the lateral resonator direction to be used whist avoiding the damaging focussed beam within the solid material of the planar waveguide. Simultaneously the resonator provides a low-loss configuration in the transverse direction.

Preferably, the two mirrors are formed and arranged so as to form a confocal negative branch unstable resonator in the lateral direction, and the focal point of the negative branch resonator is disposed outside the planar waveguide gain section. Alternatively, the two mirrors may be formed and arranged so as to form a near-confocal negative branch unstable resonator in the lateral direction. In the latter case, where the two mirrors each have a respective focal point, the focal point of each mirror is preferably disposed outside the planar waveguide gain section.

The planar waveguide gain section preferably comprises a multi-mode waveguide. Optionally, the resonator may further include transverse mode selection means. Most conveniently this may be in form of a slit formed between the edges of two plates positioned between the planar waveguide and the output mirror, preferably positioned close to, most preferably just in front of, an output mirror of the resonator. The slit is preferably formed and arranged so as to allow substantially all, preferably at least 99%, of the fundamental laser mode to be transmitted, but to least partially block transmission of higher order modes. The slit preferably extends generally laterally, generally perpendicular to the resonator axis, and may extend beyond the edges of the output mirror.

The waveguide core may, for example, be made of an active solid-state material such as, for example, yttrium aluminium garnet doped with neodymium (Nd:YAG). The upper and lower cladding layers preferably each have lower refractive index than the waveguide core. At least one of the cladding layers may be made of an un-doped material. Preferably, the planar waveguide is a multi-mode waveguide. In use of the solid-state laser, the active solid-state material is preferably optically pumped by, for example, one or more diode lasers. Alternatively, the planar waveguide may form part of a broad-junction semiconductor laser diode which, in use, is pumped by electrical current, or the planar waveguide could be constructed from transparent ceramic material.

Preferably one of the mirrors, hereinafter referred to as the "output mirror", is cutaway or otherwise truncated in the lateral direction, to allow transmission of the laser output beam around the edge of the mirror. The amount by which the output mirror is cutaway can be used to determine the fraction of the laser beam that is coupled out of the resonator. Alternatively, the output mirror may be provided with a partially transmitting coating or, more beneficially, a variable reflectivity mirror (VRM) coating, to allow coupling of light through the mirror.

The position and radius of curvature of the output mirror preferably correspond substantially to the Degnan and Hall Case II configuration. The position and radius of curvature of the rear mirror preferably correspond approximately to the Degnan and Hall Case I configuration.

Preferably, the output mirror has a spherical radius of curvature $R_1$. The other mirror, hereinafter referred to as the "rear mirror", may also have a spherical radius of curvature $R_2$.

Advantageously, where the waveguide core has a core thickness, a, in the transverse direction, the distance, $d_1$, measured along the resonator axis, between the output mirror and a front face of the planar waveguide, is equal to the concave spherical radius $R_1$ of the output mirror, as long as $d_1$ is substantially greater than $0.33a^2/\lambda$, where $\lambda$ is the wavelength of emission of the laser. By this means the high intensity focus in the lateral direction associated with the negative branch resonator is placed at a distance $R_1/2$ from the output mirror, centrally in the air space between the front waveguide facet and the output mirror, where it cannot cause optical damage to the laser gain medium, while at the same time this configuration provides a low-loss resonator in the transverse direction with exceptionally good selection of the fundamental transverse mode.

Alternatively, the rear mirror may be a concave cylindrical mirror arranged so as to act as a plane mirror in the transverse direction. In this case the rear mirror fulfils the Case I condition exactly, whereby mode-coupling losses are minimised.

In another possible embodiment one or both of the mirrors may have toroidal mirror surfaces.

The resonator may further include one or more additional components inserted in the open space between the planar waveguide and the output mirror. The additional components may be selected from: an acousto-optic modulator; an electro-optic modulator; a polariser; a frequency doubling crystal.

According to a second aspect of the invention there is provided an improved planar waveguide laser comprising a planar waveguide disposed between two concave mirrors formed and arranged to form a resonator, the planar waveguide comprising a waveguide core sandwiched between an upper cladding layer and a lower cladding layer, and the waveguide and the mirrors being formed and arranged to provide a substantially confocal, preferably confocal, negative branch unstable resonator in a lateral direction, wherein the improvement comprises the waveguide core being made of a solid-state laser gain medium, and the waveguide and the mirrors being formed and arranged:

so as to provide a low loss waveguide resonator in a transverse direction; and so that the focal point of the negative branch unstable resonator is disposed outside the planar waveguide.

According to a third aspect of the invention there is provided a method of forming a resonator for a solid-state laser having a planar waveguide gain section, the planar waveguide gain section comprising a solid-state waveguide core sandwiched between an upper cladding layer and a lower cladding layer, the method comprising the steps of:

providing two concave mirrors;

disposing the planar waveguide laser gain section between the two mirrors and positioning the mirrors:

so as to form a substantially confocal negative branch unstable resonator in a lateral direction;

so as to form a low loss waveguide resonator in a transverse direction; and so that a focal point of the negative branch unstable resonator is positioned outside the planar waveguide gain section.

Preferably, the mirrors are of predetermined curvature and are positioned so as to form a confocal negative branch unstable resonator in the lateral direction.

According to a fourth aspect of the invention there is provided an improved planar waveguide gas laser comprising a planar waveguide disposed between two concave mirrors formed and arranged to form a, preferably confocal, negative branch unstable resonator in a lateral direction, a first one of the two mirrors being configured to allow a laser output beam to be coupled out of the resonator, and the planar waveguide comprising a hollow waveguide core sandwiched between an upper cladding layer and a lower cladding layer, the mirrors being formed and arranged so that:

the position and radius of curvature of the first mirror corresponds substantially to the Degnan and Hall Case II configuration; and the position and radius of curvature of the second mirror corresponds approximately to the Degnan and Hall Case I configuration; wherein the improvement comprises the inclusion of a transverse mode selector for at least partially blocking the transmission of higher order laser modes above the fundamental mode.

Preferred embodiments will now be described, by way of example only, and with reference to the accompanying drawings in which:

DETAILED DESCRIPTION OF THE PREFERRED EMBODIMENTS

Figure 2:
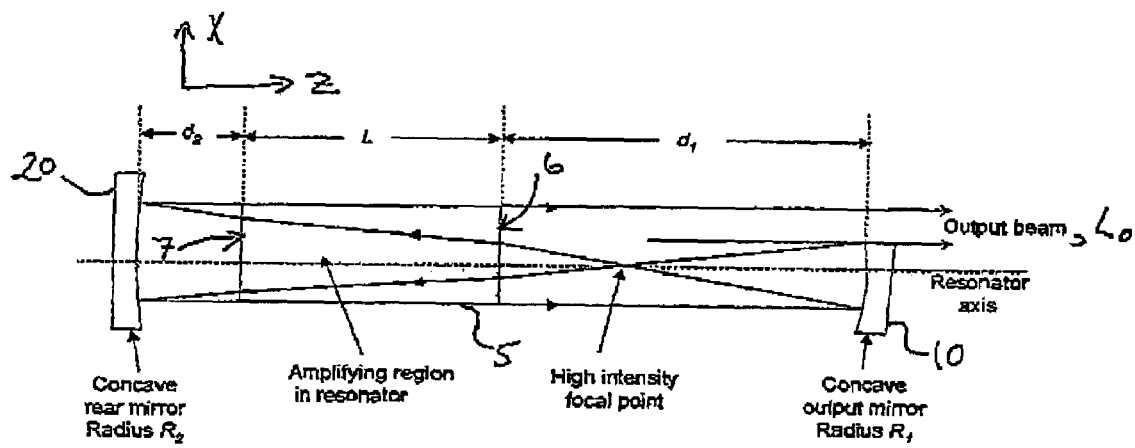
FIG. 2 is a plan schematic view of a known negative branch unstable resonator configuration.

In order to define the parameters by which the invention will be described, FIG. 2 shows a general example of a negative branch unstable resonator. The resonator contains a section 5 of gain medium of length L and refractive index n, in which the laser amplification takes place. FIG. 2 is a plan view emphasising behaviour in the lateral direction, X, normal to the laser resonator axis, Z. The gain medium 5 is not necessarily a planar waveguide and is positioned arbitrarily within the resonator. The resonator in this example has an output mirror 10 of concave spherical radius $R_1$ and a rear mirror 20 of convex spherical radius $R_2$. For this resonator to be of the confocal type, emitting a substantially parallel beam of light $L_O$ past the edge of mirror 10, the two mirror radii must be related as in the following Equation 1.

$$R_2 + R_1 = 2d_1 + 2d_2 + 2L/n \quad \text{Equation 1}$$

where $d_1$ is the distance, measured along the resonator axis, between the output mirror and an output face 6 of the gain medium 5, and $d_2$ is the distance, measured along the resonator axis, between the rear mirror and a rear face 7 of the gain medium 5, and n is the refractive index of the waveguide.

To provide a controlled output coupling from the resonator to optimise the output power of the laser, the round-trip magnification M of the resonator is chosen by the designer to have a suitable value given by the following Equation 2.

$$R_2 = MR_1 \quad \text{Equation 2}$$

A satisfactory resonator for the lateral direction, X, may be designed only using Equations (1) and (2). However such a design will not represent an efficient, low loss resonator when the gain section 5 is in the form of a planar waveguide, as no account has been made of the behaviour in the transverse direction, Y, normal to the planar waveguide 5. It is necessary to correctly match the transverse beam profile of the light emitted by the planar waveguide correctly back into the waveguide after the trip from the front face 6 of the waveguide to the output mirror 10 and back, over the distance $2d_1$. Similarly this must be done for the trip from the rear face 7 of the waveguide to the rear mirror 20 and back, over the distance $2d_2$.

In the prior art negative branch unstable resonators for gas lasers, with the mirrors and slab waveguide arranged in the dual-Case I configuration to form a low loss resonator in the transverse direction, Y, a focussed beam is produced in the laser gain medium (i.e. in the hollow region of the planar waveguide). This can be tolerated in such gas lasers as the high intensity at the focal point does not produce any damage to or breakdown of the gain medium. Such a focussed beam would, however, cause damage or breakdown of the solid-state gain medium in a solid sate laser and so, as afore-mentioned, prior art solid-state lasers have only ever used positive branch unstable resonator configurations.

In the present invention, we have found that it is possible to form a low loss waveguide resonator in the transverse direction for a solid-date laser that has a negative branch unstable resonator configuration in the lateral direction, and also position the high intensity focal point of the unstable resonator outside the planar waveguide. According to this invention, it is taught that the appropriate distance from the front face 6 of the planar waveguide to the output mirror should be $d_1 = R_1$, under the condition that $d_1$ is substantially greater in value than $0.33a^2/\lambda$ where $\lambda$ is the wavelength of emission of the laser. By this means the high intensity focus in the lateral direction associated with the negative branch resonator is placed at a distance $R_1/2$ from the output mirror, centrally in the air space between front facet and output mirror where it cannot cause optical damage to components of the laser. The arrangement simultaneously forms a very advantageous waveguide resonator in the transverse direction. The mirror curvature and position relative to the waveguide end face corresponds to that of the Degnan and Hall Case II configuration, which provides low loss for the fundamental guided mode of the waveguide in the round trip through free-space to output mirror 1. The rear mirror 2 may be placed close to the rear end face with $d_2$ small to obey the Degnan and Hall Case I condition, or a close approximation to it, which also couples the fundamental mode emitted by the waveguide back with low loss. Consequently the resonator has low unwanted loss, which is not the case for other configurations using mirrors which are not close to the planar waveguide ends.

Under this special and advantageous case of $d_1 = R_1$, the resonator design equations (1) and (2) combine to become the following.

$$R_1 = \frac{2}{M-1}\left(d_2 + \frac{L}{n}\right) \quad \text{Equation 3}$$

Figure 1:
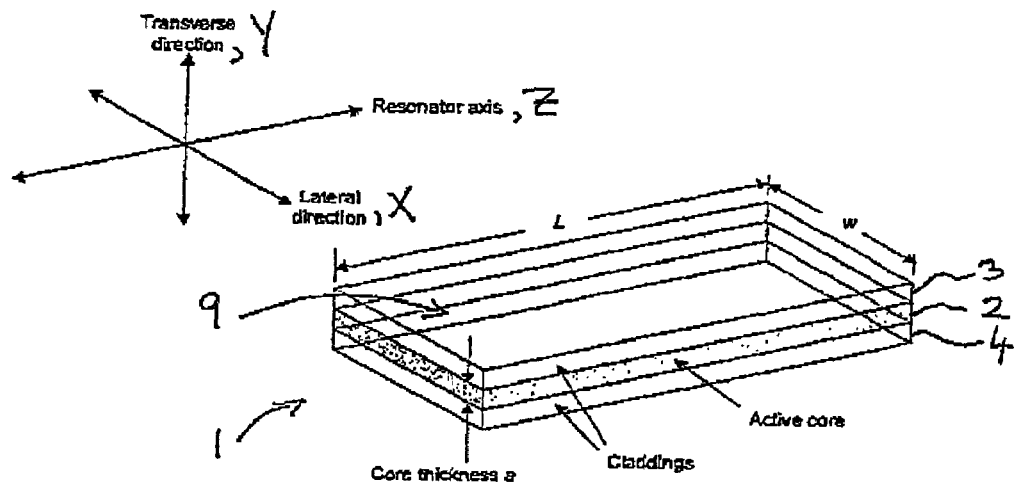
FIG. 1 is a perspective view of a planar waveguide, together with an indication of various direction parameters.
Figure 3:
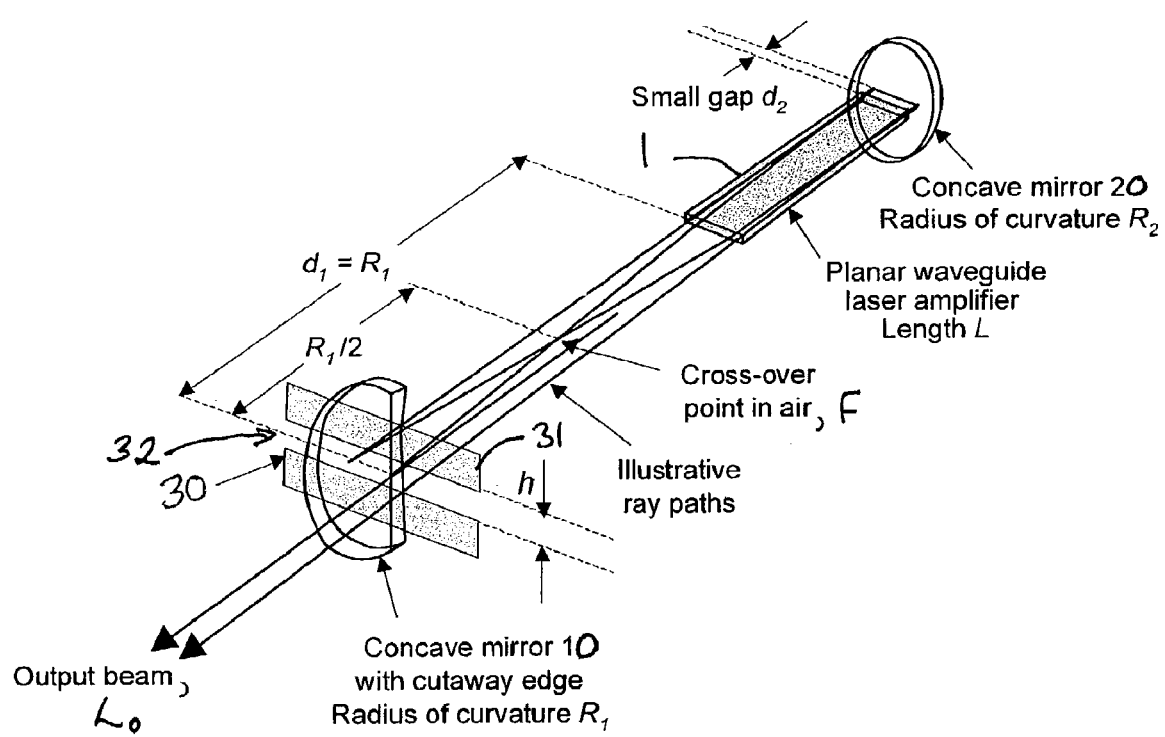
FIG. 3 is a perspective view of a solid-state planar waveguide laser resonator according to one embodiment of the invention.

A particular implementation of the invention is shown in FIG. 3. Like parts in FIGS. 1, 2 and 3 are referenced with like reference numerals. The laser amplifier section (i.e. the gain section) is in the form of an optically pumped planar waveguide 1 placed with one end face 7 close to the rear mirror 20 with a small spacing $d_2$. For the first demonstration of the invention, this waveguide 1 is made from Nd:YAG with a 200 micron thick core and has a length, L=60 mm, in the axial direction and a width, w=11 mm, in the lateral direction, and (in use) is optically pumped through a top face 9 of the waveguide 1 by an array of ten diode laser bars (not shown). For the first demonstration laser, the round-trip magnification, M, is chosen to be 1.5. The resonator component parameters are as specified by Equations (2) and (3). The output beam $L_O$ is parallel in the lateral direction, as in the illustrative ray paths in FIG. 3. The light returning from output mirror 10 towards the planar waveguide 1 goes through a focus F, indicated by the cross-over of the rays in FIG. 3, and this occurs in air half-way between the output mirror 10 and planar waveguide 1. The focus is only in the lateral direction and thus is in the category of a line focus.

Furthermore, the embodiment of FIG. 3 is provided with the facility to select the lowest order waveguide mode which propagates out of the laser with an excellent beam quality, very close to that of an ideal gaussian laser beam. This is achieved by means of a transverse mode selector slit 32. The slit is formed between the edges of two solid plates 30, 31, as shown in FIG. 3, positioned in the resonator close to the output mirror 10 and oriented so that the slit 32 extends generally in the lateral direction X, having a width, h, in the transverse direction Y. The width h of the slit 32 is adjusted to fully pass the fundamental waveguide mode whilst partially or completely blocking the higher order modes. This ability to allow positioning of a mode-selecting slit in an area where the transverse beam size is substantially larger than that within the planar waveguide is a great advantage in this resonator. Even in very high power lasers there is little difficulty with damage or burning of the slit edges by the laser power circulating in the resonator.

Figure 4:
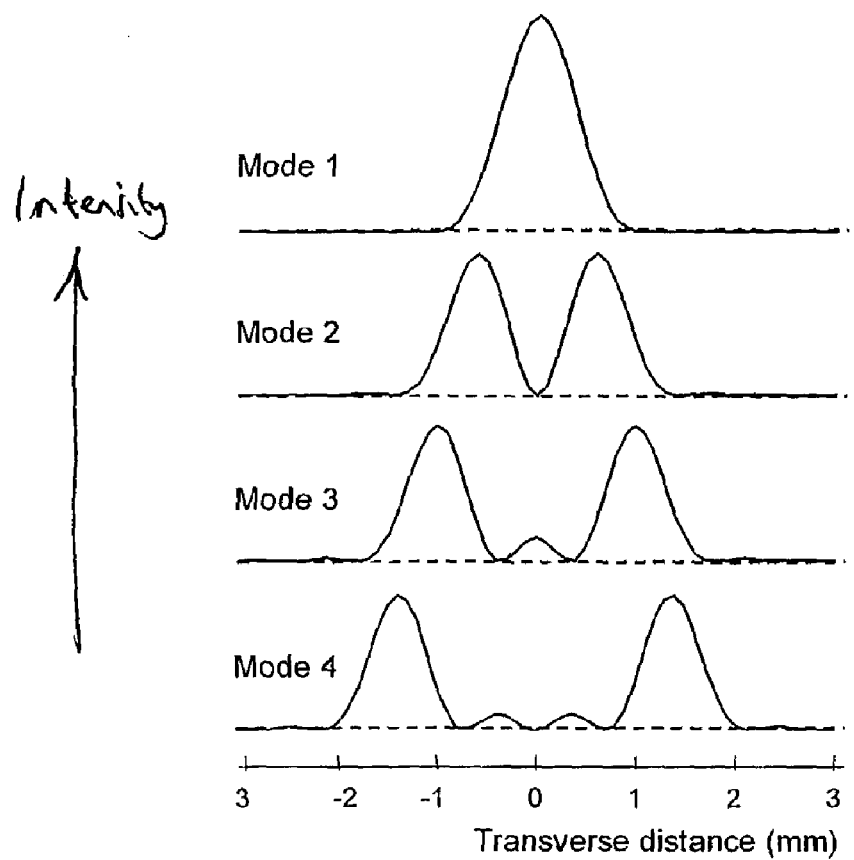
FIG. 4 shows four graphs illustrating the relative sizes of the intensity profiles of the first four modes respectively of a planar waveguide having a 200 μm thick planar waveguide solid-state core after propagating from end face of the waveguide to the output mirror of the resonator of FIG. 3.
Figure 5:
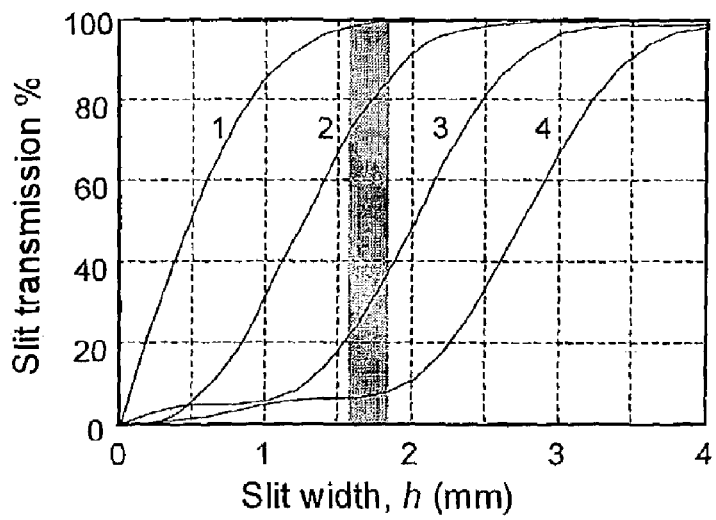
FIG. 5 is a graph of the percentage power transmission of the four transverse modes of FIG. 4 through a mode selection slit used in the resonator of FIG. 3, plotted for various different slit widths, h.

The transverse mode selection slit is unusually effective in this resonator, when compared with other more familiar types of laser resonator. This is illustrated in FIG. 4 which shows the transverse intensity profile at the position of the slit for each of the four lowest order transverse modes of propagation of a planar waveguide with a core height a of 200 microns. The slit is positioned a distance 0.138 m from the end of the waveguide and the wavelength of the light is 1064 nm. The profiles are calculated by the standard method of evaluating the diffraction integral in one dimension, as discussed for example by Siegman in his book "Lasers". The higher order mode profiles are well separated from the fundamental mode in transverse extent and the slit width, w, can be adjusted to transmit the whole of the profile for the fundamental mode 1 and partially or nearly completely block the higher order modes. In FIG. 5, the percentage power transmission through the slit is plotted for the four intensity profiles in FIG. 4, versus the width of a centrally positioned slit. The grey band indicates the preferred value of slit width, where 99% of the fundamental mode 1 is transmitted, whilst only 75% of the next order mode 2 is transmitted. This produces a strong selection of the fundamental mode of waveguide propagation as the dominant transverse resonator mode. The first demonstration laser produces over 100 W of output in a high quality transverse mode when the slit width is set 1.6 to 1.8 mm range predicted in FIG. 5.

The slit may be implemented in any suitable manner. For example, the slit 32 may be of a fixed, predetermined width, provided as the spacing between two substantial metal plates 30, 31. The spacing between the plates may be adjusted (manually, electronically and/or automatically, as desired) so as to change the slit width, h. The use of metal plates to form the slit avoids problems with heat dissipation which might be associated with other ways of implementing the slit.

Various modifications and variations to the above-described embodiment are possible within the scope of the invention. For example, the invention may equally well be applied with advantage to other types of planar waveguide gain medium, using other doped crystals such as ytterbium-doped YAG, or doped glass waveguides, or waveguides constructed from doped ceramics, or the waveguides within broad junction diode lasers. It may also be considered for use with a hollow waveguide gas laser such as the $CO_2$ laser, where the above-described mirror positioning provides a new low loss resonator configuration.

The above-described embodiment of the invention used spherical mirrors 10, 20 at both ends of the resonator. In this case, the rear mirror only approximates the Degnan and Hall Case I condition. However the invention may equally be applied if mirror 20, the rear mirror, is a concave cylindrical mirror. In this case, the rear mirror acts as a plane mirror in the transverse direction, fulfilling the Case I condition exactly and minimising mode-coupling losses. The cylindrical radius in the lateral direction is chosen to provide desired the unstable resonator characteristics using Equations 2 and 3.

On the grounds of ease of manufacture, spherical and cylindrical surfaces are preferred. However, further embodiments arise if toroidal mirror surfaces are available, in which the radius of curvature is different in the transverse and lateral direction. For example, a toroidal reflector as the rear mirror 20 may allow the beneficial Degnan and Hall Case III condition in the transverse direction to be combined with the negative branch resonator in the lateral direction. A toroidal front (i.e. output) mirror 10 will give additional flexibility in the design of resonator, for example by providing different combinations of magnification M and resonator cavity length to those for a spherical output mirror.

As an alternative to using a toroidal mirror surface, a similar function may be obtained by the use of an auxiliary cylindrical lens placed in the space between the end of the waveguide and the mirror. The mirror may then again be spherical or cylindrical. The mirror-waveguide distance equivalent to Case III must now be evaluated specifically using for instance the General Huygens' Integral given by Siegman on page 805 of his text book "Lasers".

In other modified embodiments, the coupling of light past the edge of the output mirror 10 in the FIG. 3 embodiment may be replaced by coupling of the light through the output mirror 10 using a partially transmitting mirror coating or, more beneficially, a variable reflectivity mirror coating (VRM).

In related embodiments, the open sections of the resonator between the waveguide and output mirror that are sufficiently away from the focus position F may be used for the insertion of additional components. Examples of the extra components may be an acousto-optic modulator, an electro-optic modulator, a polariser or a frequency doubling crystal, as are common requirements in solid-state laser technology. In the case of extra components which have no net focal power, the effect of the refractive index of each component must be accounted for in the resonator design to maintain the simultaneous Case II condition at the output mirror 10 and the confocal condition for the lateral unstable resonator. For example, if one additional component of length $L_1$ and refractive index $n_1$ is added, the confocal condition (Equation 1) becomes $$R_2 + R_1 = 2d_1 + 2d_2 + 2L/n + \frac{2L_1(n_1 - 1)}{n_1} \quad \text{Equation 4}$$

The distance $d_1$ between the end-face 6 of the waveguide and the output mirror 10 required to obtain the advantages of the invention is increased by the presence of the component. The condition is now:

$$d_1 = R_1 + \frac{L_1(n_1 - 1)}{n_1} \qquad \text{Equation 5}$$

If more components are added these equations may similarly be easily updated.

The invention claimed is:

1. A resonator for a solid-state planar waveguide laser, the resonator comprising two concave mirrors, one disposed on either side of a multi-mode planar waveguide gain section of the laser, the planar waveguide gain section comprising a solid-state waveguide core sandwiched between an upper cladding layer and a lower cladding layer, wherein the two mirrors are formed and arranged relative to the planar waveguide gain section:
  so as to provide a substantially confocal negative branch unstable resonator in a lateral direction;
  so as to provide a low loss waveguide resonator in a transverse direction; and
  so that a focal point of the negative branch unstable resonator is disposed outside the planar waveguide gain section;
    and wherein a first one of the mirrors is an output mirror configured to couple light out of the resonator, and the position and radius of curvature of said output mirror corresponds substantially to the Degnan and Hall Case II configuration.

2. A resonator according to claim 1, wherein the two mirrors are formed and arranged so as to form a confocal negative branch unstable resonator in the lateral direction, and the local point of the resonator is disposed outside the planar waveguide gain section.

3. A resonator according to claim 1, wherein each mirror has a respective focal point, the two mirrors are formed and arranged so as to form a near-confocal negative branch unstable resonator in the lateral direction, and the focal point of each mirror is disposed outside the planar waveguide gain section.

4. A resonator according to claim 1, wherein the resonator further includes a transverse mode selector.

5. A resonator according to claim 4, wherein the transverse mode selector is formed and arranged so as to allow substantially all of the fundamental laser mode to be transmitted, but to least partially block transmission of higher order modes.

6. A resonator according to claim 4, wherein the transverse mode selector is disposed between the planar waveguide gain section and an output one of the mirrors.

7. A resonator according to claim 4, wherein the transverse mode selector comprises two plates positioned between the planar waveguide gain section and an output one of the mirrors, the two plates being arranged so as to define a transverse mode selection slit therebetween.

8. A resonator according to claim 1, wherein the output mirror is cutaway in the lateral direction in order to couple output laser light around the edge of the mirror.

9. A resonator according to claim 1, wherein the output mirror is provided with a partially transmitting coating to allow transmission of an output laser beam through the mirror.

10. A resonator according to claim 1, wherein the output mirror has a variable reflectivity mirror (VRM) coating to allow coupling of an output laser beam through the mirror.

11. A resonator according to claim 1, wherein the position and radius of curvature of the second one of the mirrors corresponds approximately to the Degnan and Hall Case I configuration.

12. A resonator according to claim 11, wherein the position and radius of curvature of the second one of the mirrors corresponds substantially to the Degnan and Hall Case I configuration.

13. A resonator according to claim 1, wherein the position and radius of curvature of the second one of the mirrors corresponds substantially to the Degnan and Hall Case III configuration.

14. A resonator for a solid-state planar waveguide laser, the resonator comprising two concave mirrors, one disposed on either side of a multi-mode planar waveguide gain section of the laser, the planar waveguide gain section comprising a solid-state waveguide core sandwiched between an upper cladding layer and a lower cladding layer, wherein the two mirrors are conformed and arranged relative to the planar waveguide gain section;
  so as to provide a substantially confocal negative branch unstable resonator in a lateral direction;
  so as to provide a low loss waveguide resonator in a transverse direction; and
  so that the focal point of the negative branch unstable resonator is disposed outside the planar waveguide gain section; and
wherein both the mirrors have a concave spherical surface, a first one of the mirrors is an output mirror configured to couple light out of the resonator, the waveguide core has a core thickness, a, in the transverse direction, the distance, $d_1$, measured along the resonator axis, between the output mirror and a front face of the planar waveguide, is equal to the concave spherical radius $R_1$ of the output mirror ($d_1 = R_1$) and $d_1$ is substantially greater than $0.33a^2/\lambda$, where $\lambda$ is the wavelength of emission of the laser.

15. A resonator according to claim 1, wherein the output mirror has a concave spherical surface and the second one of the mirrors has a concave cylindrical surface.

16. A resonator according to claim 13, wherein at least one of the mirrors has a concave toroidal surface.

17. A resonator according to claim 13, wherein at least one of the mirrors has a concave spherical surface and an auxiliary cylindrical lens is disposed between the concave spherical mirror and the planar waveguide gain section, so as to provide a configuration equivalent to the use of a toroidal mirror surface.

18. A resonator according to claim 13, wherein at least one of the mirrors has a concave cylindrical surface and an auxiliary cylindrical lens is disposed between the concave spherical mirror and the planar waveguide gain section, so as to provide a configuration equivalent to the use of a toroidal mirror surface.

19. A resonator according to claim 1, further including at least one additional component inserted in the open space between the planar waveguide gain section and the output mirrors.

20. A resonator according to claim 19, wherein said at least one additional component is selected from: an acousto-optic modulator; an electro-optic modulator; a polarizer; a frequency doubling crystal.

21. An improved planar waveguide laser comprising a multi-mode planar waveguide disposed between two concave mirrors formed and arranged to form a resonator, the planar waveguide comprising a waveguide core sandwiched between an upper cladding layer and a lower cladding layer, and the waveguide and the mirrors being formed and arranged to provide a substantially confocal negative branch unstable resonator in a lateral direction, wherein the improvement comprises the waveguide core being made of a solid-state laser gain medium, and the waveguide and the mirrors being formed and arranged:
  so as to provide a low loss waveguide resonator in a transverse direction; and
  so that a focal point of the negative branch unstable resonator is disposed outside the planar waveguide; and
  wherein a first one of the mirrors is an output mirror configured to couple light out of the resonator, and the position and radius of curvature of said output mirror corresponds substantially to the Degnan and Hall Case II configuration.

22. A planar waveguide laser according to claim 21, wherein the two mirrors are formed and arranged so as to form a confocal negative branch unstable resonator in the lateral direction, and the focal point of the negative branch unstable resonator is disposed outside the planar waveguide.

23. A planar waveguide laser according to claim 21, wherein each mirror has a respective focal point, the two mirrors are formed and arranged so as to form a near-confocal negative branch unstable resonator in the lateral direction, and the focal point of each said mirror is disposed outside the planar waveguide gain section.

24. A planar waveguide laser according to claim 21, wherein the laser further includes a transverse mode selector formed and arranged to allow substantially all of the fundamental laser mode to be transmitted, but to least partially block transmission of higher order modes.

25. A planar waveguide laser according to claim 21, wherein the solid-state waveguide core is made of an active doped material.

26. A planar waveguide laser according to claim 25, wherein the waveguide core is made of yttrium aluminium garnet doped with neodymium (Nd:YAG) or ytterbium (Yb:YAG).

27. A planar waveguide laser according to claim 21, wherein the multi-mode planar waveguide forms part of a broad-junction semiconductor laser diode.

28. A method of forming a resonator for a solid-state laser having a multi-mode planar waveguide gain section, the planar waveguide gain section comprising a solid-state waveguide core sandwiched between an upper cladding layer and a lower cladding layer, the method comprising the steps of:
  providing two concave mirrors, one of said mirrors being an output mirror configured to couple light out of the resonator;
  disposing the planar waveguide laser gain section between the two mirrors and positioning the mirrors;
  so as to form a substantially confocal negative branch resonator in a lateral direction;
  so as to form a low loss waveguide resonator in a transverse direction; and
  so that a focal point of the negative branch unstable resonator is positioned outside the planar waveguide gain section;
  and such that the position and radius of curvature of said output mirror corresponds substantially to the Degnan and Hall Case II configuration.

29. The method according to claim 28, wherein the mirrors are positioned so as to form a confocal negative branch resonator in the lateral direction and the focal point of the negative branch unstable resonator is positioned outside the planar waveguide gain section.

30. The method according to claim 28, wherein the mirrors each have a respective focal point, the mirrors are positioned so as to form a near-confocal negative branch resonator in the lateral direction, and the focal point of each mirror is positioned outside the planar waveguide gain section.

31. The method according to claim 28, further comprising the step of performing transverse mode selection on the laser beam before it propagates out of the resonator.

32. The method according to claim 31, wherein the transverse mode selection is achieved by positioning a transverse mode selector inside the resonator, the mode selector having a slit of predetermined size provided therein, and positioning the mode selector such that the slit allows the fundamental laser mode to be substantially fully transmitted therethrough while at least partially blocking higher order modes from being transmitted therethrough.

33. An improved planar waveguide gas laser comprising a planar waveguide disposed between two concave mirrors formed and arranged to form a substantially confocal negative branch unstable resonator in a lateral direction, a first one of the two mirrors being configured to allow a laser output beam to be coupled out of the resonator, and the planar waveguide comprising a hollow waveguide core sandwiched between an upper cladding layer and a lower cladding layer, and the mirrors being formed and arranged so that:
  the position and radius of curvature of the first mirror corresponds substantially to the Degnan and Hall Case II configuration; and
  the position and radius of curvature of the second mirror corresponds approximately to the Degnan and Hall Case I configuration; wherein the improvement comprises the inclusion of a transverse mode selector for at least partially blocking the transmission of higher order laser modes above the fundamental mode.

34. The planar waveguide gas laser according to claim 33, wherein the mirrors are formed and arranged to provide a confocal negative branch unstable resonator in the lateral direction.

35. The planar waveguide gas laser according to claim 33, wherein the mirrors are formed and arranged to provide a near-confocal negative branch unstable resonator in the lateral direction.

36. An improved planar waveguide gas laser comprising a planar waveguide disposed between two concave mirrors formed and arranged to form a substantially confocal negative branch unstable resonator in a lateral direction, a first one of the two mirrors being configured to allow a laser output beam to be coupled out of the resonator, and the planar waveguide comprising a hollow waveguide core sandwiched between an upper cladding layer and a lower cladding layer, and the mirrors being formed and arranged so that:
  the position and radius of curvature of the first mirror corresponds substantially to the Degnan and Hall Case II configuration; and
  the position and radius of curvature of the second mirror corresponds substantially to the Degnan and Hall Case III configuration; wherein the improvement comprises the inclusion of a transverse mode selector for at least partially blocking the transmission of higher order laser modes above the fundamental mode.

37. The planar waveguide gas laser according to claim 36, wherein the mirrors are formed and arranged to provide a confocal negative branch unstable resonator in the lateral direction.

38. The planar waveguide gas laser according to claim 36, wherein the mirrors are formed and arranged to provide a near-confocal negative branch unstable resonator in the lateral direction.

39. A resonator for a solid-state planar waveguide laser, the resonator comprising two concave mirrors, one disposed on either side of a multi-mode planar waveguide gain section of the laser, the planar waveguide gain section comprising a solid-state waveguide core sandwiched between an upper cladding layer and lower cladding layer, wherein a first one of the mirrors is an output mirror configured to couple light out of the resonator, and the mirrors being formed and arranged so that:
- the position and radius of curvature of the first mirror corresponds substantially to the Degnan and Hall Case II configuration; and
- the position and radius of curvature of the second mirror corresponds substantially to the Degnan and Hall Case I configuration; and
- wherein the resonator further includes a transverse mode selector for at least partially blocking the transmission of higher order laser modes above the fundamental mode.

40. A resonator for a solid-state planar waveguide laser, the resonator comprising two concave mirrors, one disposed on either side of a multi-mode planar waveguide gain section of the laser, the planar waveguide gain section comprising a solid-state waveguide core sandwiched between an upper cladding layer and a lower cladding layer, wherein a first one of the mirrors is an output mirror configured to couple light out of the resonator, and the mirror being formed and arranged so that:
- the position and radius of curvature of the first mirror corresponds substantially to the Degnan and Hall Case II configuration; and
- the position and radius of curvature of the second mirror corresponds substantially to the Degnan and Hall Case III configuration; and
- wherein the resonator further includes a transverse mode selector for at least partially blocking the transmission of higher order laser modes above the fundamental mode.

* * * * *